United States Patent
Kim et al.

(10) Patent No.: US 12,440,877 B2
(45) Date of Patent: Oct. 14, 2025

(54) ROLLING APPARATUS FOR SECONDARY BATTERY ELECTRODE SHEET, CATHODE ELECTRODE MANUFACTURED THEREBY AND SECONDARY BATTERY

(71) Applicants: SK On Co., Ltd., Seoul (KR); People and Technology, Inc., Gyeongsangbuk-do (KR)

(72) Inventors: Yun Jong Kim, Daejeon (KR); Se Hun Park, Daejeon (KR); Joon Sup Kim, Gyeongsangbuk-do (KR); Young Cheol Lee, Gyeongsangbuk-do (KR); Sung Youl Choi, Gyeongsangbuk-do (KR)

(73) Assignees: SK On Co., Ltd., Seoul (KR); People and Technology, Inc., Gyeongsangbuk-do (KR)

( * ) Notice: Subject to any disclaimer, the term of this patent is extended or adjusted under 35 U.S.C. 154(b) by 295 days.

(21) Appl. No.: 18/186,198

(22) Filed: Mar. 20, 2023

(65) Prior Publication Data
US 2023/0311180 A1 Oct. 5, 2023

(30) Foreign Application Priority Data
Mar. 23, 2022 (KR) .......................... 10-2022-0035862

(51) Int. Cl.
*B21B 1/24* (2006.01)
*B21B 45/02* (2006.01)
*H01M 4/04* (2006.01)

(52) U.S. Cl.
CPC ............ *B21B 1/24* (2013.01); *B21B 45/0218* (2013.01); *H01M 4/0435* (2013.01); *B21B 2267/06* (2013.01)

(58) Field of Classification Search
CPC ....... B21B 1/24; B21B 27/02; B21B 45/0218; B21B 2267/06
See application file for complete search history.

(56) References Cited

U.S. PATENT DOCUMENTS

| | | | | |
|---|---|---|---|---|
| 4,587,702 A | * | 5/1986 | Kates ...................... | B21B 27/02 72/203 |
| 2007/0251349 A1 | * | 11/2007 | Berger .................. | B21B 35/141 74/825 |

(Continued)

FOREIGN PATENT DOCUMENTS

| JP | 3817938 B2 | 9/2006 |
|---|---|---|
| JP | 3937561 B2 | 6/2007 |

(Continued)

OTHER PUBLICATIONS

Prior Arts Search Report submitted to Korean Patent Office for Accelerated Examination Request of the Korean Patent Application No. 10-2022-0035862.

(Continued)

*Primary Examiner* — Teresa M Ekiert
(74) *Attorney, Agent, or Firm* — IP & T GROUP LLP

(57) ABSTRACT

A rolling apparatus for a secondary battery electrode sheet, may include: a transfer unit transferring an electrode sheet having an electrode mixture layer applied to at least one surface thereof in a first direction; a rolling roll pressing the electrode sheet in a second direction, intersecting the first direction; and a support portion coupled to a rotational axis of the rolling roll to support rotation of the rolling roll, wherein the rolling roll May have a shape in which a central portion thereof in an axial direction protrudes further toward the electrode sheet than both end portions of thereof in an axial direction.

9 Claims, 7 Drawing Sheets

(56) References Cited

U.S. PATENT DOCUMENTS

| | | | |
|---|---|---|---|
| 2018/0047974 A1 | 2/2018 | Jo et al. | |
| 2020/0185698 A1 | 6/2020 | Kim et al. | |
| 2020/0350579 A1 | 11/2020 | Lee et al. | |

FOREIGN PATENT DOCUMENTS

| | | | |
|---|---|---|---|
| JP | 2011181348 A | 9/2011 | |
| KR | 20080036741 A | 4/2008 | |
| KR | 20170037100 A | 4/2017 | |
| KR | 20170063146 A | 6/2017 | |
| KR | 20180022039 A | 3/2018 | |
| KR | 20190076027 A | 7/2019 | |
| KR | 20200069906 A | 6/2020 | |
| KR | 20200126648 A | 11/2020 | |
| WO | 2017/052283 A1 | 3/2017 | |

OTHER PUBLICATIONS

Office Action on the Korean Patent Application No. 10-2022-0035862 issued by the Korean Patent Office on Sep. 27, 2023.
Extended European Search Report for European Patent Application No. 23163161.5 issued by the European Patent Office on Jun. 10, 2024.

\* cited by examiner

ROLLING APPARATUS FOR SECONDARY BATTERY ELECTRODE SHEET, CATHODE ELECTRODE MANUFACTURED THEREBY AND SECONDARY BATTERY

CROSS-REFERENCE TO RELATED APPLICATION(S)

This application claims the benefit under 35 USC 119 (a) of Korean Patent Application No. 10-2022-0035862 filed on Mar. 23, 2022 in the Korean Intellectual Property Office, the entire disclosure of which is incorporated herein by reference for all purposes.

BACKGROUND

The present disclosure relates to a rolling apparatus for a secondary battery electrode sheet, and a cathode electrode manufactured thereby and a secondary battery.

Recently, with rapid progress in miniaturization and weight reductions of mobile electronic devices, demand for a secondary battery as an energy source thereof is rapidly increasing.

A secondary battery is a battery capable of repeated charging and discharging because mutual conversion between chemical energy and electrical energy is reversible.

A manufacturing process of the secondary battery is largely divided into an electrode process for manufacturing an electrode, an assembly process for manufacturing a battery, and a chemical conversion process for imparting electrical characteristics to the battery.

Thereamong, the electrode process is the most important process among secondary battery manufacturing processes, and is divided into a mixing process, a coating process, a rolling process, a cutting process, a drying process, and the like.

According to the electrode process, an active material (hereinafter, a mixture layer) prepared in the mixing process is applied to both surfaces of a current collector in the coating process, and is then compressed on both surfaces of the current collector through the rolling process.

That is, a current collector (hereinafter referred to as an electrode sheet) coated with a mixture layer on both surfaces thereof is compressed while passing through a pair of rolling rolls in the rolling process, so that adhesion between the current collector and a slurry is improved, and as a thickness of the electrode sheet is reduced, energy density is improved.

Meanwhile, since the electrode sheet undergoing the rolling process becomes reduced only in thickness without changing a length thereof, mixture density (g/cc) of the electrode is determined through the rolling process.

In particular, since an anode electrode cannot excessively increase a degree of pressure applied to the electrode sheet due to a crystal structure of a carbon-based (e.g., graphite) active material, there is a limit to increasing the mixture density thereof through the rolling process, but since a cathode electrode does not have such limitations, the rolling process of the cathode electrode is directly related to the energy density of the secondary battery.

Meanwhile, in the conventional rolling process, a rolling roll having a large diameter was used to improve rolling performance. However, when force applied to the electrode sheet is the same, as a diameter of the rolling roll increases, a contact area thereof with the electrode sheet increases and the pressure applied to the electrode sheet decreases, so there is a limit to rolling the electrode sheet at high density.

SUMMARY

An aspect of the present disclosure is to provide a rolling apparatus for a secondary battery electrode sheet capable of manufacturing a secondary battery having improved energy density.

In addition, an aspect of the present disclosure is to provide a cathode electrode having improved energy density and a secondary battery including the same.

According to an aspect of the present disclosure, a rolling apparatus for a secondary battery electrode sheet may include: a transfer unit transferring an electrode sheet having an electrode mixture layer applied to at least one surface thereof in a first direction; a rolling roll pressing the electrode sheet in a second direction, intersecting the first direction; and a support t portion coupled to a rotational axis of the rolling roll to support rotation of the rolling roll, wherein the rolling roll may have a shape in which a central portion thereof in an axial direction protrudes further toward the electrode sheet than both end portions of thereof in an axial direction.

According to an asepect of the present disclosure, a cathode electrode manufactured by the rolling apparatus may have a mixture density of 3.60 (g/cc) or more and 3.80 (g/cc) or less.

According to an asepect of the present disclosure, a secondary battery may comprise: the cathode electrode manufactured by the roling apparatus; and an anode electrode.

According to another aspect of the present disclosure, a rolling apparatus for a secondary battery electrode sheet may include: a transfer unit transferring an electrode sheet having an electrode mixture layer applied to at least one surface thereof in a first direction; a rolling roll pressing the electrode sheet in a second direction, intersecting the first direction; and a support portion coupled to a rotational axis of the rolling roll to support rotation of the rolling roll, wherein the rolling roll may include a curved surface of which a central portion thereof in an axial direction protrudes toward the electrode sheet.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
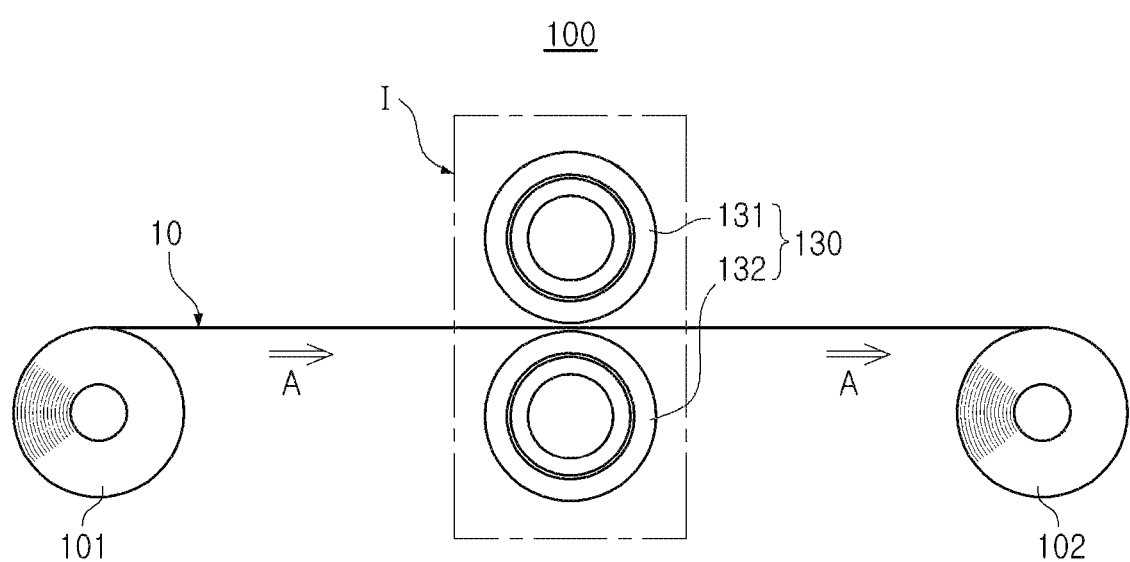
FIG. 1 is a schematic side view of a rolling apparatus according to an embodiment of the present disclosure.

Prior to the detailed description of the present disclosure, the terms or words used in the present specification and claims described below should not be construed as being limited to a common or dictionary meaning, and the inventor intends to use his/her invention in the best way. Based on the principle that terms may be properly defined for description, they should be interpreted as meanings and concepts consistent with the technical spirit of the present disclosure. Therefore, the embodiments described in this specification and the configurations shown in the drawings are only the most preferred embodiments of the present disclosure, and do not represent all of the technical spirit of the present disclosure, so it should be understood that there may be various equivalents and modifications that can be substituted therefor at the time of this application.

Hereinafter, preferred embodiments of the present disclosure will be described in detail with reference to the accompanying drawings. At this time, it should be noted that the same components in the accompanying drawings are indicated by the same reference numerals as much as possible. In addition, detailed descriptions of well-known functions and configurations that may obscure the gist of the present disclosure will be omitted below, and for the same reason, some components in the accompanying drawings are exaggerated, omitted, or schematically illustrated, and the size of each component does not entirely reflect the actual size thereof.

In addition, in the present disclosure, expressions such as upper side (upper portion), lower side (lower portion), side surface, and the like are described based on the accompanying drawings, and it is stated in advance that they may be expressed differently if a direction of the object is changed.

Figure 2:
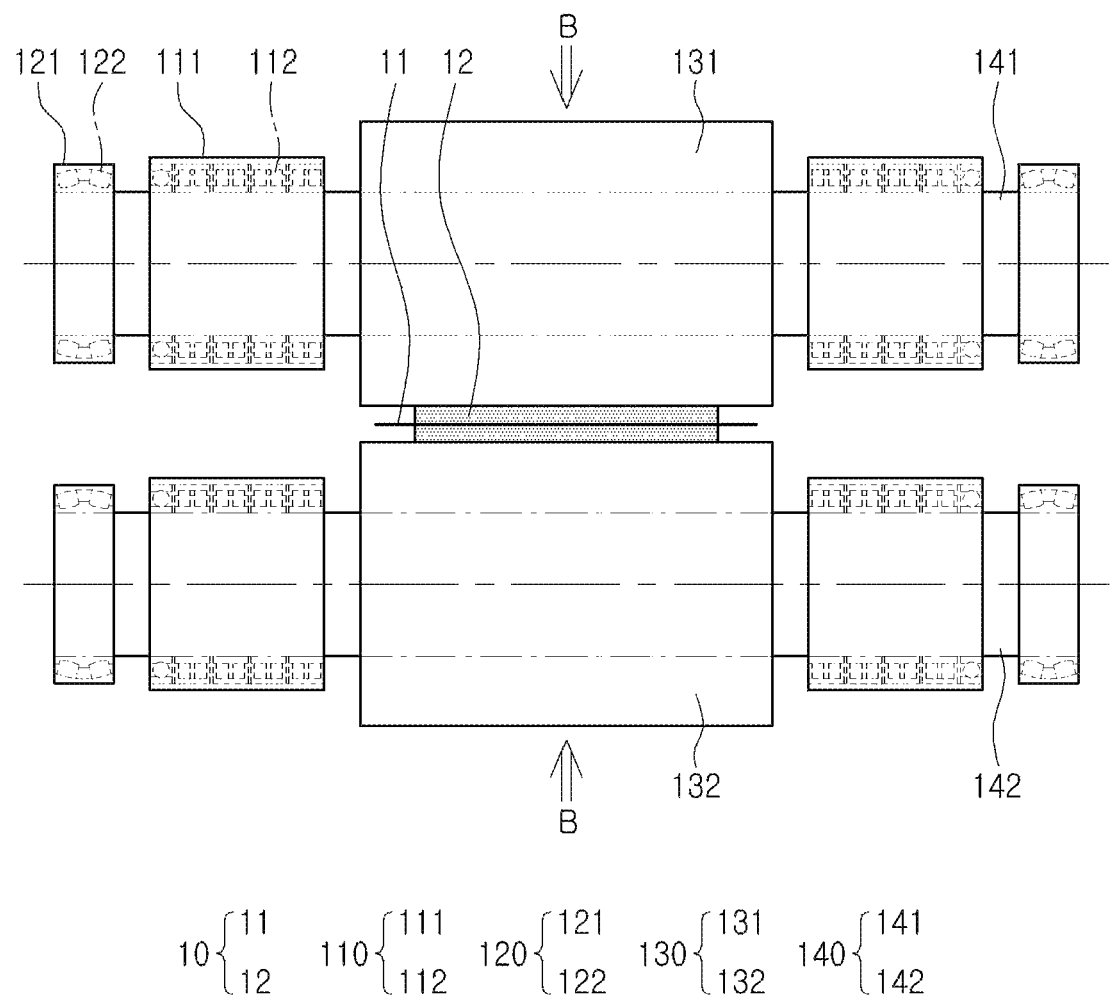
FIG. 2 is a schematic front view of region I of FIG. 1.

FIG. 1 is a schematic side view of a rolling apparatus according to an embodiment of the present disclosure, and FIG. 2 is a schematic front view of region I in FIG. 1.

A rolling apparatus for a secondary battery electrode sheet (hereinafter, referred to as a rolling apparatus) 100 according to an embodiment of the present disclosure may be an apparatus for rolling an electrode sheet to a predetermined thickness in a rolling process during a process for manufacturing a secondary battery. Preferably, the rolling apparatus 100 according to an embodiment of the present disclosure may be used to manufacture a cathode electrode.

Referring to FIG. 1, the rolling apparatus 100 may include an unwinder 101 and a rewinder 102. The unwinder 101 and the rewinder 102 may be sequentially disposed in a transfer direction (hereinafter, referred to as a first direction) (A) of the electrode sheet 10.

Meanwhile, although not illustrated in the drawing, one or more auxiliary rolls may be provided between the unwinder 101 and the rewinder 102 to assist in the transfer of the electrode sheet 10.

The unwinder 101 and the rewinder 102 may rotate in the same direction in synchronization with each other. For example, the unwinder 101 and the rewinder 102 may rotate in the first direction (A) in synchronization with each other. The unwinder 101 and the rewinder 102 may also be referred to as a transfer unit.

The electrode sheet 10 may be wound around the unwinder 101, and the unwinder 101 may supply the electrode sheet 10 in the first direction (A) while rotating. The rewinder 102 may wind the electrode sheet 10. In detail, the rewinder 102 may wind the electrode sheet 10 rolled by a rolling roll 130 to be described later.

Referring to FIG. 1, a rolling roll 130 rolling the electrode sheet 10 may be disposed between the unwinder 101 and the rewinder 102 based on a first direction (A).

The rolling roll 130 may be provided as a pair thereof. The rolling roll 130 may include a first rolling roll 131 disposed on one side of the electrode sheet 10 to press one surface of the electrode sheet 10 and a second rolling roll 132 disposed on the other side of the electrode sheet 10 to press the other surface of the electrode sheet 10.

Based on the drawings, the first rolling roll 131 is disposed on an upper side of the electrode sheet 10 to press an upper surface of the electrode sheet 10, and the second rolling roll 132 is disposed on a lower side of the electrode sheet 10 to press a lower surface of the electrode sheet 10.

The electrode sheet 10 is supplied between the first rolling roll 131 and the second rolling roll 132, and may be rolled while passing through a pair of rolling rolls 130. The rolling roll 130 may press the electrode sheet 10 in a second direction (B), intersecting the first direction (A) in which the electrode sheet 10 is transferred. The second direction (B) in which the rolling roll 130 presses the electrode sheet 10 may be a direction, perpendicular to the first direction (A).

Referring to FIG. 2, the electrode sheet 10 supplied between a pair of rolling rolls 130 may have a form in which an electrode mixture layer 12 is applied to a current collector 11. The electrode mixture layer 12 may be a layer including an electrode active material, a conductive agent, and a binder. The electrode mixture layer 12 may be compressed to the current collector 11 while passing through the pair of rolling rolls 130.

Meanwhile, although the drawing illustrates that the electrode mixture layer 12 is applied to both surfaces of the current collector 11, the electrode mixture layer 12 may be applied to at least one surface of the current collector 11. For example, an electrode sheet 10, disposed on the outermost side of an electrode assembly, may have an electrode mixture layer 12 applied to one surface thereof.

The electrode sheet 10 before passing through the rolling roll 130 and the electrode sheet 10 passing through the rolling roll 130 may have different thicknesses. In detail, the thickness of the electrode sheet 10 passing through the rolling roll 130 may be thinner than the thickness of the electrode sheet 10 before passing through the rolling roll 130. In this case, since the length of the electrode sheet 10 is maintained, the mixture density and energy density of the electrode sheet 10 may be improved while passing through the rolling roll 130.

The rolling roll 130 may be formed of a 5% Cr Steel material having high surface strength. The 5% Cr Steel material has deep heat treatment depth, so that local deformation of the rolling roll 130 may be prevented.

The rolling roll 130 may rotate while being coupled to a rotational axis 140, having a length thereof in a width direction of the electrode sheet 10. For example, the first rolling roll 131 may be coupled to a first rotational axis 141 to rotate, and the second rolling roll 132 may be coupled to the second rotational axis 142 to rotate.

Meanwhile, for convenience of description, the rolling roll 130 and the rotational axis 140 have been described as being separate components, but the rolling roll 130 and the rotational axis 140 may be integrally formed. That is, the rotational axis 140 may be a part of the rolling roll 130.

Support portions 110 and 120 supporting the rotation of the rolling roll 130 may be coupled to the rotational axis 140.

The support portions 110 and 120 may be coupled to the rotational axis 140 to support a load of the rolling roll 130 while helping the rolling roll 130 smoothly rotate.

Referring to FIG. 2, a rolling roll 130 is coupled to a central portion of the rotational axis 140 in a longitudinal direction, and a first support portion 110 is coupled to an external surface of the rolling roll 130, and a second support portion 120 may be coupled to an external surface of the first support portion 110. In addition, the first support portion 110 and the second support portion 120 may be provided on both sides of the rolling roll 130.

The first support portion 110 may include a first housing 111 and a first bearing 112.

The first housing 111 may include a hollow formed in a longitudinal direction of a rotational axis 140, and the rotational axis 140 may be disposed in the hollow.

In addition, the first bearing 112 may be accommodated in the first housing 111. In detail, the first bearing 112 may be disposed along a circumferential surface of the hollow. Accordingly, the rotational axis 140 may contact the first bearing 112 while being coupled to the first housing 111.

According to the present disclosure, the first bearing 112 may be pressed in the direction in which the rolling roll 130 presses the electrode sheet 10. For example, although not specifically illustrated in the drawings, the first bearing 112 may be connected to a static pressure cylinder through a rod, and the rolling roll 130 may be pressed in a direction in which the rolling roll 130 presses the electrode sheet 10 by extension of the rod.

Similarly, the second support portion 120 may also include a second housing 121 and a second bearing 122. The second housing 121 may include a hollow formed in a longitudinal direction of a rotational axis 140, and the rotational axis 140 may be disposed in the hollow.

In addition, the second bearing 122 may be accommodated in the second housing 121. In detail, the second bearing 122 may be disposed along a circumferential surface of the hollow. Accordingly, the rotational axis 140 may contact the second bearing 122 while being coupled to the second housing 121.

According to the present disclosure, the second bearing 122 may be pressed in a direction, opposite to the direction in which the rolling roll 130 presses the electrode sheet 10. For example, although not specifically illustrated in the drawing, the second bearing 122 may be connected to a counter pressure cylinder through a rod, and may be pressed in a direction, opposite to the direction in which the rolling roll 130 presses the electrode sheet 10 by extension of the rod.

Specifically, the first bearing 112 is pressed in a central direction in a form of pushing the electrode sheet 10 to secure process performance by applying compressive force for rolling to the electrode sheet 10, and the second bearing 122 relieves bending of the rolling roll 130 occurring when the electrode sheet 10 is rolled, and at the same time, when the electrode sheet 10 is not rolled, the second bearing 122 may be pressed in an opposite direction thereto to separate the first rolling roll 131 and the second rolling roll 132 disposed vertically, from each other.

Meanwhile, the rolling apparatus 100 according to an embodiment of the present disclosure proposes a rolling roll 130 having a new structure for rolling the electrode sheet 10 at high density.

Hereinafter, with reference to FIGS. 3 to 6, the rolling roll 130 according to an embodiment of the present disclosure will be described in detail.

Figure 3A:
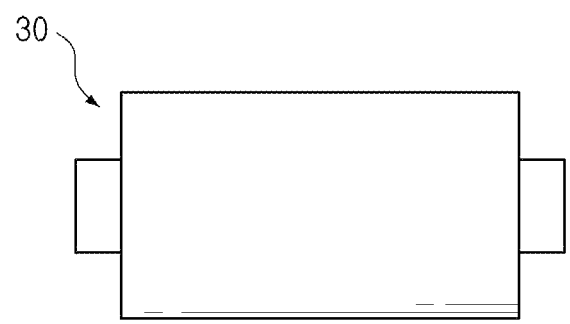
FIG. 3A and FIG. 3B are conceptual diagrams of a shape of a rolling roll according to the prior art and an embodiment of the present disclosure.
Figure 3B:
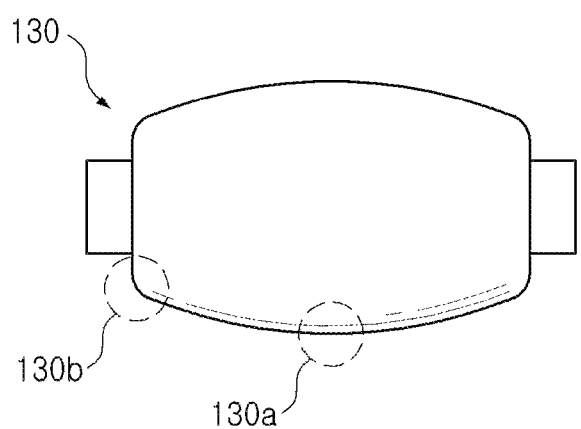
Figure 4:
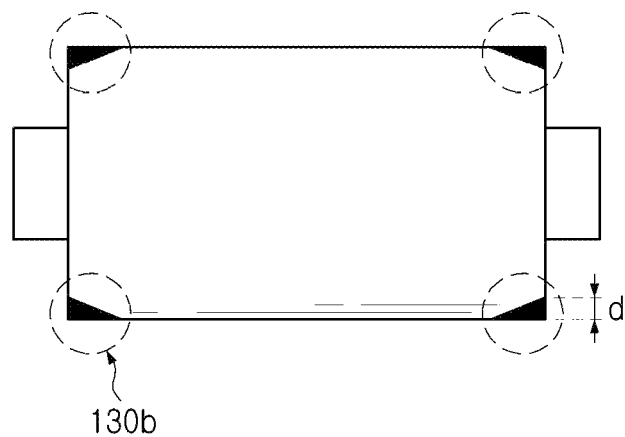
FIG. 4 is a view illustrating a processed portion of a rolling roll according to an embodiment of the present disclosure.

FIG. 3A and FIG. 3B are conceptual diagrams of a shape of a rolling roll according to the prior art and an embodiment of the present disclosure, and FIG. 4 is a view illustrating a processed portion of a rolling roll according to an embodiment of the present disclosure.

Referring to FIG. 3A, in a conventional rolling roll 30, a portion (a central portion of the rolling roll) for pressing the electrode sheet 10 is formed in a flat shape (a flat roll). On the other hand, referring to FIG. 3B, in a rolling roll 130 according to an embodiment of the present disclosure, the portion for pressing the electrode sheet 10 (hereinafter, referred to as the central portion of the rolling roll) may be formed to protrude toward the electrode sheet 10 (a crown roll).

The rolling roll 130 may have a shape in which a central portion 130a thereof in a direction of the rotational axis 140 (hereinafter, referred to as an axial direction) protrudes toward the electrode sheet 10 further than both end portions 130b thereof in the axial direction. Furthermore, the rolling roll 130 may be formed in a curved shape in which the central portion 130a thereof in the axial direction protrudes toward the electrode sheet 10.

The rolling roll 130 may be formed to be longer than the electrode sheet 10 in the axial direction, and accordingly, a portion of the rolling roll 130 in the axial direction may not contact the electrode sheet 10 passing through the rolling roll 130. In detail, when it is assumed that centers of the rolling roll 130 and the electrode sheet 10 in the axis direction coincide, both end portions 130b of the rolling roll 130 may not contact the electrode sheet 10.

That is, both end portions 130b of the rolling roll 130 mentioned above may refer to a portion that does not contact the electrode sheet 10 passing through the rolling roll 130. In addition, the central portion 130a of the rolling roll 130 may refer to a portion in contact with the electrode sheet 10 passing through the rolling roll 130, and may partially include a portion, not in contact with the electrode sheet 10. The central portion 130a may be a portion excluding both end portions 130b of the rolling roll 130.

The rolling roll 130 according to an embodiment of the present disclosure may be manufactured by chamfering both end portions 130b. As illustrated in FIG. 4, both end portions 130b of the rolling roll may be processed to a predetermined width (length in the axial direction) and depth. For example, both end portions 130b of the rolling roll may be processed such that a maximum processing depth d is within 3 mm in a width range of 20 mm to 30 mm.

Furthermore, when the electrode sheet 10 according to an embodiment of the present disclosure presses the electrode sheet 10, it may include a curved surface in a form of a multi-order (quadratic, cubic, or quaternary) function so that the rolling roll 130 is bent to uniformly roll the electrode sheet 10 in a flat shape.

Meanwhile, with the above-described chamfering, both end portions 130b of the rolling roll 130 may have a more deeply recessed shape in a direction away from the central portion 130a in the axial direction. Therefore, a distance between the first rolling roll 131 and the second rolling roll 132 may increase from the central portion 130a to both end portions 130b in the axial direction, and through this structure, the side kiss phenomenon during conventional rolling illustrated in FIG. 5A may be solved.

Figure 5A:
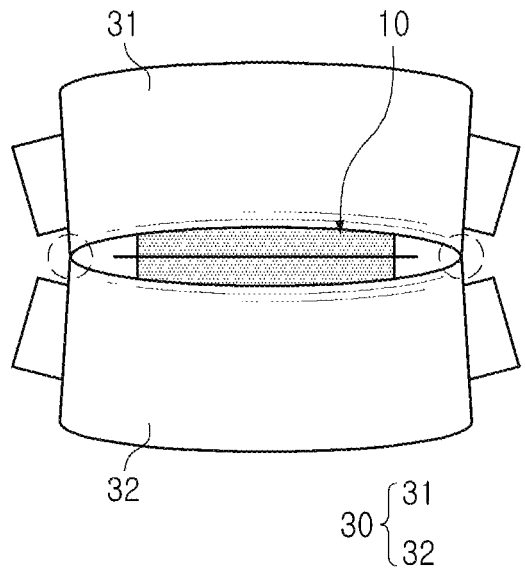
FIG. 5A and FIG. 5B are conceptual views illustrating a cross-section of the rolling roll of FIG. 3A and FIG. 3B during rolling of an electrode sheet.
Figure 5B:
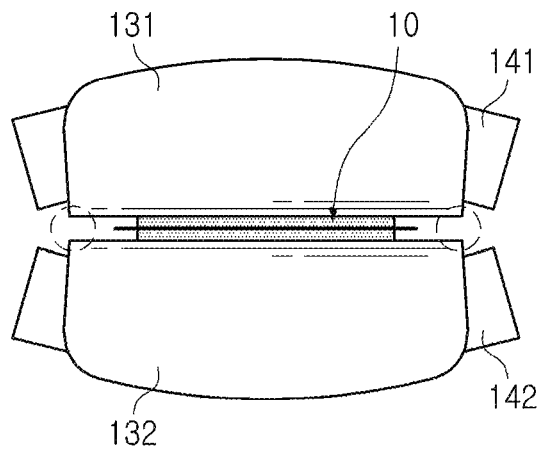

FIG. 5A and FIG. 5B are conceptual views illustrating a cross-section of the rolling roll of FIG. 3A and FIG. 3B during rolling of an electrode sheet.

Referring to FIG. 5A, in a rolling roll 30, which is flat in an axial direction, as in the prior art, a central portion of the rolling roll 30 moves up and down as an electrode sheet 10 is supplied between a first rolling roll 31 and a second rolling 32, so that different degrees of pressures may be applied to the central portion of the electrode sheet 10 and a peripheral portion thereof (hereinafter referred to as an edge of the electrode sheet 10) in the axial direction. That is, a relatively low degree of pressure was applied to the central portion of the electrode sheet 10, and a relatively high degree of pressure was applied to the edge of the electrode sheet 10. Accordingly, a tensile value acting on the edge of the electrode sheet 10 exceeds an allowable value, so that there may be a problem in which the electrode sheet 10 is broken.

In particular, when the electrode sheet 10 is rolled at high density, this phenomenon is intensified and a side kiss phenomenon in which both end portions of the first rolling roll 31 and the second rolling roll 32 come into contact with each other occurred. When the side kiss phenomenon occurs, since a load is applied between the rolling rolls 31 and 32 and the pressure applied to the electrode sheet 10 is relatively reduced, high-density rolling of the electrode sheet 10 is inhibited. In addition, since a difference in thickness due to a difference in pressure applied between the central portion and the edge of the electrode sheet 10 causes cell assembly failure, there is a limit to setting target rolling density to be high.

Referring to FIG. 5B, since the rolling roll 130 according to an embodiment of the present disclosure has a shape in which the central portion 130a in an axial direction protrudes toward the electrode sheet 10 more than both end portions 130b in the axial direction, the first rolling roll 131 and the second rolling roll 132, even if the electrode sheet 10 is supplied between the first rolling roll 131 and the second rolling roll 132 so that the central portion 130a of the rolling roll 130 moves up and down, both end portions 130b of the rolling roll 130 may not come into contact with each other.

According to an embodiment of the present disclosure, when the electrode sheet 10 is supplied between the rolling rolls 130, the protruding central portion 130a of the rolling roll 130 moves up and down, so that it has a height similar to that of both end portions 130b of the rolling roll 130, so that one surface of the first both end portions 131 and one surface of the second both end portions 132 may be substantially parallel to each other, pressing the electrode sheet 10 in the axial direction.

Therefore, the rolling roll 130 according to an embodiment of the present disclosure may press the electrode sheet 10 with a constant pressure regardless of a position of the electrode sheet 10 in the axial direction, and may roll the electrode sheet 10 to a certain thickness. In addition, since a load of the rolling roll 130 is applied only to the electrode sheet 10, the electrode sheet 10 may be manufactured to have higher density.

In addition, according to an embodiment of the present disclosure, the rolling roll 130 may be formed to have a diameter in a range of 450 mm to 550 mm. Preferably, the rolling roll 130 may be formed to have a diameter of 500 mm.

Figure 6A:
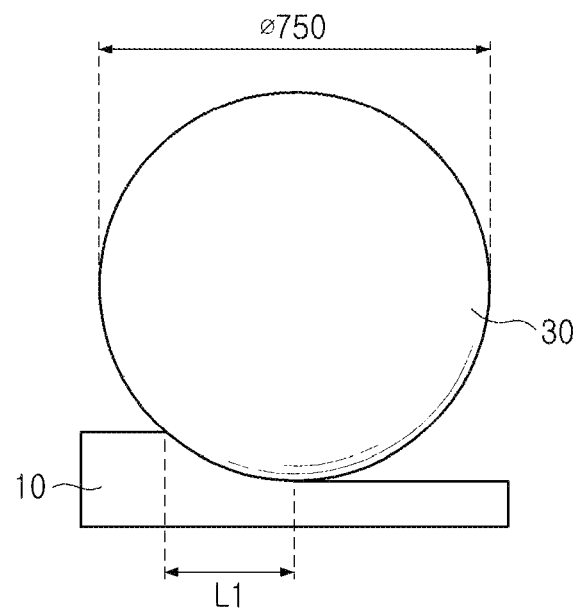
FIG. 6A and FIG. 6B are conceptual diagrams illustrating a comparison of rolling lengths according to a diameter of a rolling roll.
Figure 6B:
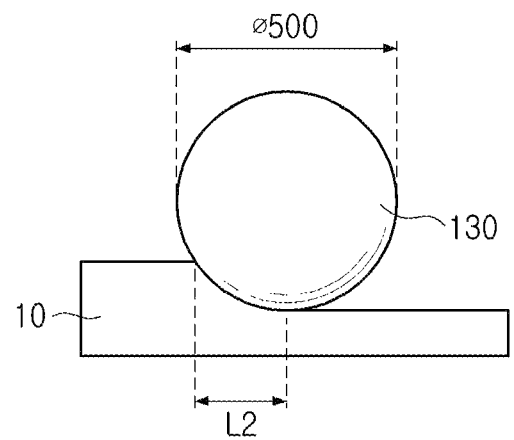

FIG. 6A and FIG. 6B are conceptual diagrams illustrating a comparison of a rolling length according to a diameter of a rolling roll.

Conventionally, as illustrated in FIG. 6A, the electrode sheet 10 was rolled using a rolling roll 30 having a diameter of about 750 mm, but in the present disclosure, as illustrated in FIG. 6B, the electrode sheet 10 is rolled using a rolling roll 130 having a diameter of about 500 mm. In the case of using the rolling roll 130 having a reduced diameter as described above, pressure applied to the electrode sheet 10 is increased, so that mixture density thereof may be improved.

In detail, when a distance between a first rolling roll 131 disposed on an upper side of the electrode sheet 10 and a second rolling roll 132 disposed on a lower side of the electrode sheet 10 are the same, assuming that the same degree of force is applied to the electrode sheet 10, a contact area between the rolling roll 130 and the electrode sheet 10 decreases as the diameter of the rolling roll 130 decreases, so that the pressure applied to the electrode sheet 10 may be increased. Therefore, it is possible to roll the electrode sheet 10 at higher density.

In this regard, referring to FIG. 6A and FIG. 6B, a rolling length L2 during rolling using the rolling roll 130 having a diameter of 500 mm is shorter than a rolling length L1 during rolling using the rolling roll 30 having a diameter of 750 mm, which means that the contact area therebetween is reduced.

Meanwhile, as the diameter of the rolling roll 130 is reduced, the electrode sheet 10 can be rolled at high density, but the diameter of the rotational axis 140 is also reduced, so when the same load is applied thereto, there is a problem in that structural rigidity is weak, as compared to the conventional rolling roll 30.

Accordingly, according to an embodiment of the present disclosure, the structure of the first bearing 112 for supplementing the structural rigidity of the rolling roll 130 may be applied.

Figure 7:
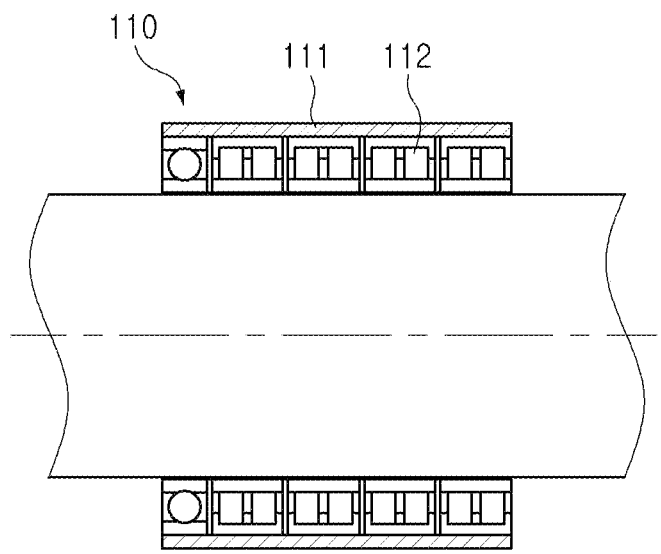
FIG. 7 is a cross-sectional view of a first support portion according to an embodiment of the present disclosure.

FIG. 7 is a cross-sectional view of a first support portion according to an embodiment of the present disclosure.

Referring to FIG. 7, a first bearing 112 may be provided as a four-row roller bearing. According to an embodiment of the present disclosure, since the first bearing 112 is provided as four rows instead of being provided as two rows in the prior art, a contact area thereof with a rotating axis 140 may increase, thereby stably supporting rotation of a rotating axis 140 and a rolling roll 130.

In addition, in a process in which the rolling roll 130 presses the electrode sheet 10, heat may be generated by friction, or the like, between the rotating axis 140 and the first support portion 110 or the second support portion 120, rotating together with the rolling roll 130, and the generated heat may be conducted to the rolling roll 130.

Accordingly, according to an embodiment of the present disclosure, the first housing 111 may include a refrigerant passage 113 through which refrigerant is supplied. For example, cold water may be supplied to the refrigerant passage 113, and the first support portion 110 may be cooled by the cold water supplied to the first housing 111.

Figure 8:
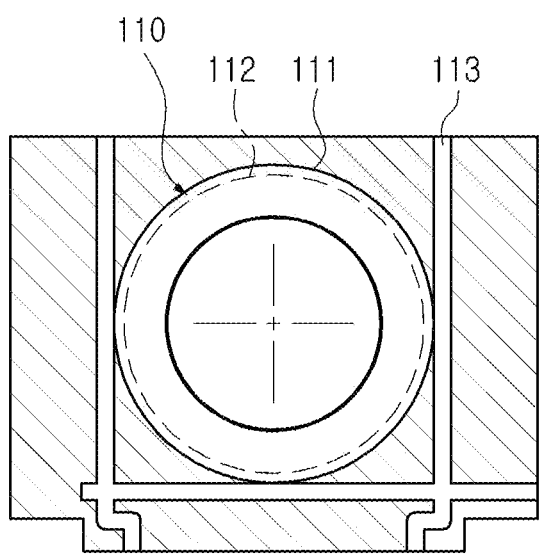
FIG. 8 is another cross-sectional view of a first support portion according to an embodiment of the present disclosure.

FIG. 8 is another cross-sectional view of a first support portion according to an embodiment of the present disclosure.

Referring to FIG. 8, the first housing 111 may include a refrigerant passage 113, and the refrigerant passage 113 may be formed to surround a first bearing 112. In detail, the refrigerant passage 113 may be formed to surround an external surface of the first bearing 112, and may be provided so as to be as close to the first bearing 112 as possible on the external surface of the first bearing 112 for effective cooling.

As described above, the first housing 111 may include the refrigerant passage 113 on the external surface of the first bearing 112, so that the cooling effect of the first bearing 112 and the rotating axis 140 may be improved.

In addition, it is possible to minimize a heat generation phenomenon of the first support portion 110 and conduction of heat generated from the second support portion 120 and the first support portion 110 to the rolling roll 130 through the supply of the refrigerant.

Meanwhile, there is a difference in thermal expansion amount exists between the both end portions 130b and the central portion 130a of the rolling roll 130, adjacent to the first support portion 110 and the second support portion 120 due to the heat generation phenomenon of the first support portion 110 and the second support portion 120.

According to an embodiment of the present disclosure, a difference in thermal expansion between both end portions 130b and the central portion 130a of the rolling roll 130 may be reduced due to the cooling effect of the first support portion 110.

Summarizing the contents described above, the rolling apparatus 100 according to an embodiment of the present disclosure may roll the electrode sheet 10 at high density, and thus has an effect of manufacturing a secondary battery having improved energy density.

In addition, since both end portions 130b of a pair of rolling rolls 130 do not come into contact during rolling, uniform rolling may be performed regardless of a position of the electrode sheet 10, so that the frequency of breakage of the electrode sheet 10 may be reduced, and since a period of use of the rolling roll 130 is also extended, operating costs may be reduced.

As set forth above, according to an embodiment of the present disclosure, in a rolling apparatus for a secondary battery electrode sheet according to an embodiment of the present disclosure, pressure applied to the electrode sheet increases during rolling, so that a secondary battery having improved energy density may be manufactured and the performance of the secondary battery may be improved.

Hereinafter, the present disclosure will be described in more detail through specific examples. The following examples are only examples to help the understanding of the present disclosure, and the scope of the present disclosure is not limited thereto.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rolling apparatus for a secondary battery electrode sheet, comprising:

a transfer unit transferring an electrode sheet having an electrode mixture layer applied to at least one surface thereof in a first direction;

a rolling roll pressing the electrode sheet in a second direction, intersecting the first direction; and a support portion coupled to a rotational axis of the rolling roll to support rotation of the rolling roll, wherein the rolling roll has a shape in which a central portion thereof in an axial direction protrudes further toward both end portions of thereof in an axial direction, wherein the support portion comprises:

a first support portion disposed outside the rolling roll in a longitudinal direction of the rotational axis, the first support portion including a first bearing that is pressed in a direction in which the rolling roll presses the electrode sheet, and a first housing in which the first bearing is accommodated; and a second support portion disposed outside the first support portion in a longitudinal direction of the rotational axis, the second support portion including a second bearing that is pressed in a direction, opposite to the direction in which the first bearing is pressed, and a second housing in which the second bearing is accommodated.

2. The rolling apparatus for a secondary battery electrode sheet of claim 1, wherein both end portions of the rolling roll are recessed by a depth of 3 mm or less from a surface of the rolling roll.

3. The rolling apparatus for a secondary battery electrode sheet of claim 2, wherein both end portions of the rolling roll in the axial direction have a shape of being recessed more deeply in a direction away from the central portion thereof in the axial direction.

4. The rolling apparatus for a secondary battery electrode sheet of claim 1, wherein the rolling roll comprises:

a first rolling roll pressing one surface of an electrode sheet; and a second rolling roll pressing the other surface of the electrode sheet, wherein a distance between the first rolling roll and the second rolling roll increases from the central portion thereof in the axial direction toward both end portions thereof in the axial direction.

5. The rolling apparatus for a secondary battery electrode sheet of claim 4, wherein when the first rolling roll and the second rolling roll press the electrode sheet, both end portions of the first rolling roll and the second rolling roll are not in contact with each other.

6. The rolling apparatus for a secondary battery electrode sheet of claim 1, wherein the rolling roll is formed to have a diameter in a range of 450 mm to 550 mm.

7. The rolling apparatus for a secondary battery electrode sheet of claim 1, wherein the first bearing comprises a four-row roller bearing.

8. The rolling apparatus for a secondary battery electrode sheet of claim 1, wherein the first housing comprises a refrigerant passage through which a refrigerant is supplied.

9. The rolling apparatus for a secondary battery electrode sheet of claim 8, wherein the refrigerant passage is provided to surround an external surface of the first bearing.

* * * * *